United States Patent

Ohara

[11] Patent Number: 5,920,357
[45] Date of Patent: Jul. 6, 1999

[54] DIGITAL COLOR TRANSIENT IMPROVEMENT

[75] Inventor: Kazuhiro Ohara, Plano, Tex.

[73] Assignee: Texas Instruments Incorporated, Dallas, Tex.

[21] Appl. No.: 08/780,518

[22] Filed: Jan. 8, 1997

Related U.S. Application Data

[60] Provisional application No. 60/009,745, Jan. 11, 1996.
[51] Int. Cl.⁶ .................................................. H04N 5/208
[52] U.S. Cl. ......................... 348/625; 348/627; 348/630; 348/606
[58] Field of Search ..................................... 348/625, 627, 348/630, 631, 606; 382/262, 266; H04N 5/208

[56] References Cited

U.S. PATENT DOCUMENTS

| 4,758,891 | 7/1988 | Hitchcock et al. . |
| 4,935,806 | 6/1990 | Rabii ......................................... 358/37 |
| 5,218,438 | 6/1993 | Kim . |

FOREIGN PATENT DOCUMENTS 0 683 605 A2  11/1995  European Pat. Off. .

OTHER PUBLICATIONS

Pekka Heinonen, et al. "FIR–Median Hybrid Filters with Predictive FIR Substructures" IEEE, vol. 36, No. 6, Jun. 1988.

Primary Examiner—Sherrie Hsia
Attorney, Agent, or Firm—Robert C. Klinger; James C. Kesterson; Richard L. Donaldson

[57] ABSTRACT

A digital color transient improvement (CTI) method and apparatus for enhancing the color sharpness of a chrominance signal by increasing the steepness of color edges without ringing. A median logic circuit (30) samples three signals A, B and C, and selects values from these three signals to provide an output signal that has steep color edges. One signal (A) is the non-processed input signal, a second signal (C) is a twice delayed input signal, and the third signal (B) is the derivative of the once delayed input signal. The present invention is ideally utilized by an SVP and requires a minimum number of instructions, but can also be implemented by a small number of gates on an ASIC or FPGA.

17 Claims, 4 Drawing Sheets

BLOCK DIAGRAM OF DCTI

DIGITAL COLOR TRANSIENT IMPROVEMENT

This application claims priority under 35 USC § 119 (e)(1) of provisional application No. 60/009,745, filed Jan. 11, 1996.

FIELD OF THE INVENTION

The present invention relates generally to signal processing circuits including chrominance (chroma) processing circuits, and more particularly to a chroma processing circuit and method for increasing the transient slope of chrominance signal transitions.

BACKGROUND OF THE INVENTION

Picture signals including those of the NTSC, PAL and SECAM type all have a chroma and a luminance signal which comprises the picture information. The chroma signal bandwidth is narrow in comparison with the luminance signal bandwidth. Because of the limited frequency bandwidth of the chroma signal, chroma signal transitions (transients) are relatively slow. That is to say, the slope of a transition representing color edges has only a moderate slope, which when displayed for viewing detracts from sharp color demarcations. For instance, the transition of a typical chroma signal from the color green to the color magenta is not very steep, causing a smeared color to be viewed at the color edges.

Television systems with digital signal processing are distinguished in that the chrominance signal includes color information for discrete pixels. Digital signal processing is typically performed on these digital chrominance signals to enhance the sharpness of color transitions, especially between adjacent pixels. One such technique is disclosed in U.S. Pat. No. 4,935,806 to Rabii entitled "Chroma Noise Reduction and Transient Improvement". This technique provides an enhanced transient chroma signal with controlled undershoot and overshoot characteristics. However, this technique is somewhat complex.

Another known technique is shown in FIG. 1, whereby two bandwidth optimized paths are implemented in order to detect the position of a color transition in the incoming chrominance signals. The exact position of a color transition is calculated by detecting the corresponding zero transition of the second derivative of both chrominance signals. Low pass filtering (LPU,LPV,LPUV) is performed to avoid noise sensitivity. The width of a transition is derived from a threshold detector signal. It indicates an area around the detected position where the first derivatives of the chrominance signals exceed a programmable threshold (THRESH). The parameter THRESH modifies the sensitivity of the DCTI circuit. High THRESH values exclusively improve significant color transitions while small color variations remain unchanged. The detected transition width can be limited by the programmable parameter TRAWID. This parameter performs an adaption to the input chrominance bandwidth. For signals with small chrominance bandwidth (e.g. Video Recorders) the DCTI performance is optimized using high values for TRAWID. Input signals with high chrominance bandwidth are processed with small values of TRAWID. A more detailed discussion of this approach is disclosed in an article published in The Journal IEEE Transition on Consumer Electronics, August 1993, Volume 39, Page 247–254 entitled, A Digital Display Processor with Integrated 9 Bit Triple DAC for Enhanced TV Applications, authored by Siemens. Again, this approach is rather complex and an expensive implementation.

It is desired to provide an improved digital color transition improvement (DCTI) algorithm whereby a chrominance signal can be processed to have a steep chroma edge without ringing. The improved algorithm should be a simple architecture with logical operation, and well considered for the implementation by digital signal processing. Preferably, the algorithm could be implemented by an Scan-Line Video Processor (SVP) with few instructions, or implemented by a small number of gates on an ASIC or FPGA.

SUMMARY OF THE INVENTION

The present invention achieves technical advantages as a digital color transition improvement (DCTI) circuit which provides a steeper chroma edge without ringing. The invention has a relatively simple architecture with logical operation. The circuit comprises a first delay circuit delaying an input signal a first time period, and a second delay circuit delaying the input signal a second time period, the second delay time period being longer than the first time delay period. A derivative circuit provides a second derivative of the input signal delayed the first time period, this derivative being an approximation to a mathematical derivative. A median logic circuit provides an output signal by selecting from either the input signal, the derivative signal of the input signal delayed the first time period, or the input signal delayed the second time period whereby the output signal has a steepened chroma edge without ringing. Preferably, at the chroma rising edge, the median logic circuit selects the value of the input signal delayed the second time period until the value of the derivative signal is greater than this input signal delayed the second time period. The median logic circuit then selects the value of the input signal without any delay when the value of the derivative signal is determined to be greater than the value of the unmodified (non-delayed) input signal. The processed output signal is a sharp step without any undershoot or overshoot, whereby the derivative signal is selected for the sharp transition. When used for processing a chrominance signal, a steepened edge is provided to realize an enhanced color transition. Preferably, a band pass filter is utilized to obtain the derivative of the input signal delayed the first time period to generate an output signal having a sharp falling edge, the median logic circuit selects the value of the twice delayed input signal until the value of the derivative signal has a value less than the value of the twice delayed input signal. Then, the median logic circuit selects the value of the derivative signal until the value of the derivative signal is less than the value of the undelayed input signal, at which time the value of undelayed input signal is selected.

The method of the present invention comprises delaying a chrominance input signal a first time period and a second time period, the second time period being longer in duration than the first time period. A derivative of the input signal delayed the first time period is obtained. A median logic circuit provides an output signal by selecting a value from either the undelayed input signal, the input signal delayed the second time period, or from the derivative of the input signal delayed the first time period. Initially, at the chroma rising edge the input signal delayed the second time period is selected until the second derivative of the signal has a value greater than the value of the input signal delayed the second time period. The derivative signal is selected until its value equals that of the undelayed input signal, at which time the processed output signal comprises the undelayed input signal. The signals chosen for the falling edge is similar to provide a sharp falling edge by selecting the appropriate signal. The processed output signal from the median logic circuit has steeper slopes than the input signal, these slopes being very sharp without undershoot or overshoot. The median logic circuit only selects a value from one of three signals, and can be implemented with a minimal number of SVP instructions, or be implemented by a small number of gates on a ASIC or FPGA. Thus, the DCTI algorithm of the present invention is relatively simply and inexpensive.

DETAIL DESCRIPTION OF TBE PREFERRED EMBODIMENT

For purposes of illustration and clarity, the present invention will be described in reference to processing a bandwidth limited chrominance signal, although it is to be understood that the present invention is well suited to signal process a variety of bandwidth limited signals, and the present invention is to be appreciated as having a broad variety of signal processing applications. The present invention can be part of a digital receiver (not shown) when used for processing a chrominance signal, and will be described in reference thereto for a clear understanding of one of its applications.

Figure 1:
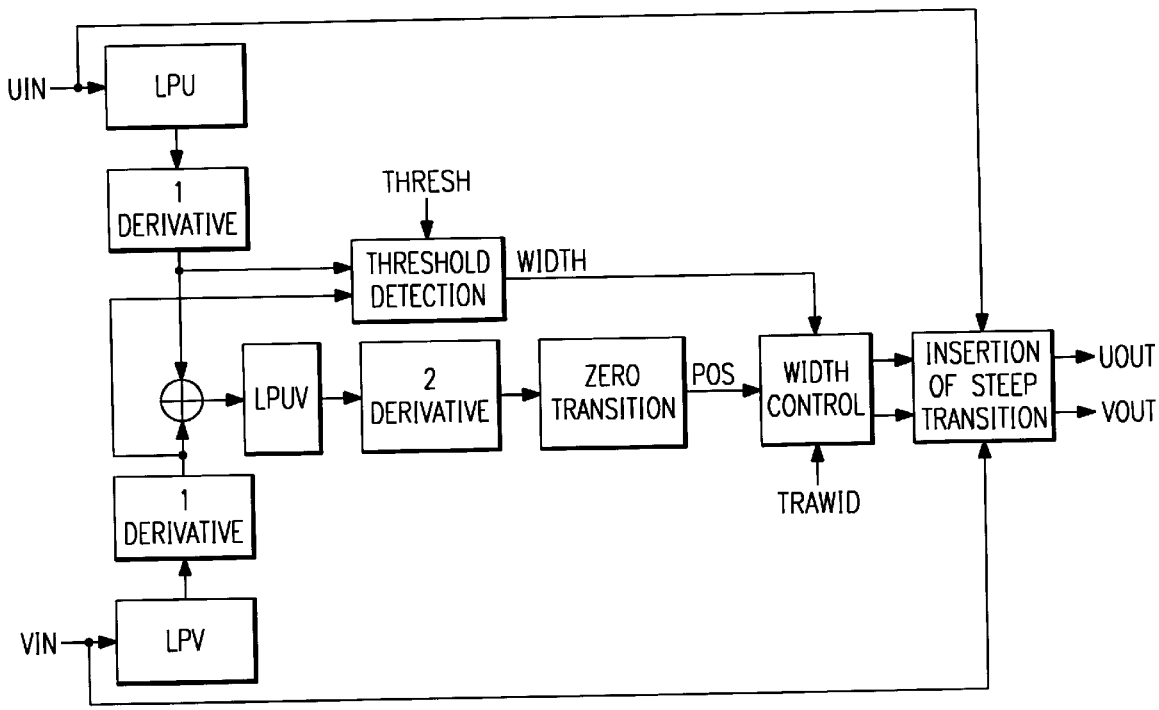
FIG. 1 is an electrical block diagram of a prior art DCTI circuit.
Figure 2:
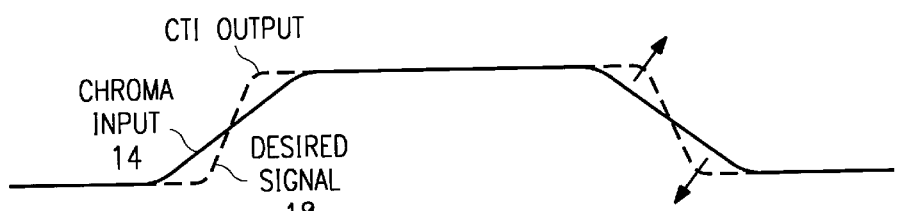
FIG. 2 is a typical base band chrominance signal waveform with a slow color edge, with a desired chrominance signal with a steep color edge and no ringing shown in dotted lines.

Referring now to FIG. 2, there is shown a graph of a typical chrominance (chroma) signal 14 indicative of a color edge, whereby the slope of the input chroma signal is lower (slow rise time) due to the limited bandwidth of the input signal. It is desired that the slope of the color edge be steep, as indicated by the dotted line 18, to enhance the color sharpness of the image to be displayed. It is important to note that signal 18 is desired to have steep slopes and no undershoot or overshoot.

Figure 3:
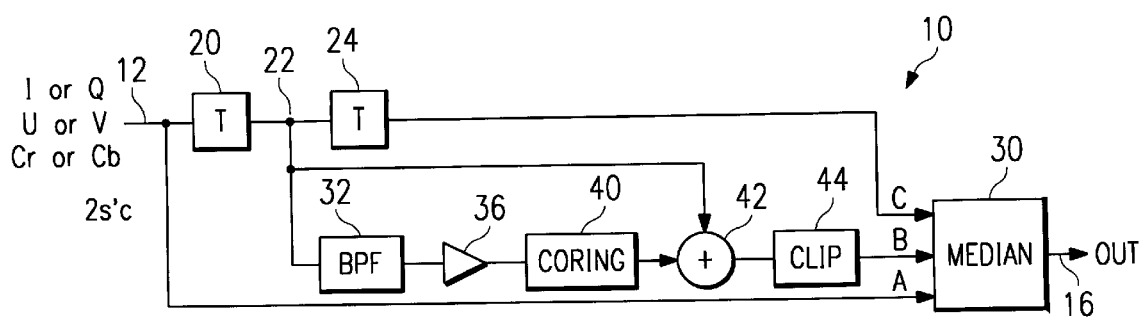
FIG. 3 is an electrical algorithm block diagram of the preferred embodiment of the present invention whereby a median logic circuit provides an output signal by selecting a value from one of three signals to provide a steep color edge such as that shown in dotted lines in FIG. 2.

Referring now to FIG. 3, there is generally shown at 10 a block diagram of a digital color transition improvement (DCTI) apparatus and algorithm according to the preferred embodiment of the present invention. Circuit 10 receives an input signal at an input terminal 12 such as a chrominance signal shown at 14 in FIG. 2, and provides an output signal at an output terminal 16 such as a desired chrominance signal with a steep edge as shown at 18 in FIG. 2. By providing an output signal 18 at terminal 16 that has steep color edges without ringing, color sharpness is improved. The improved color transient signal is typically supplied to a digital television receiver (not shown) which may incorporate the present invention.

A digitized chroma signal, indicated as the U or V component of a video signal, is applied to input terminal 12. This chroma input signal may look like signal 14 in FIG. 2. A first time delay circuit 20 delays this input signal a first time period "T", preferably about 0.148 microseconds $f_{sampling}$=13.5 MHZ, and provides this time delayed signal to node 22. A second time delay circuit 24 delays the signal from node 22 an additional time period "T", and provides this twice delayed signal as signal "C" to a median logic circuit 30.

Figure 4:
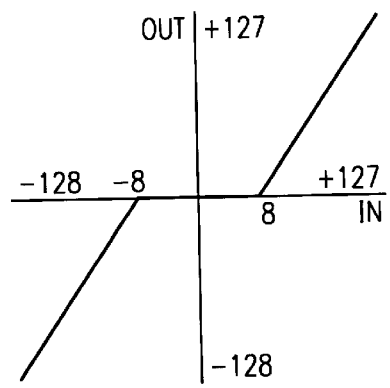
FIG. 4 is a transfer function of the coring circuit of FIG. 3.

The once delayed input signal from node 22 is also provided to a band pass filter 32, as shown. Band pass filter 32 generates the derivative of this once delayed input signal, this derivative being an approximation to a mathematical derivative, and provides this derivative to an amplifier 36. Amplifier 36 typically has a gain of about 2 for transition slope control. This amplified derivative signal is then provided to a coring circuit 40 to minimize the effects of noise and small signal transitions. The transfer function of the coring circuit 40 is shown in FIG. 4. The output of the coring circuit 40 is added with the once delayed input signal from node 22 at summer 42. The summed signal from slimmer 42 is clipped by a clip circuit 44 to eliminate any calculation underflow or overflow of the signal. The output of clip circuit 44 is provided as derivative signal "B" to median logic circuit 30. The non-processed (non-delayed) input signal 14 from input terminal 12 is provided as signal "A" to median logic circuit 30, as shown. Median logic circuit 30 selects a value of one of the input signals A, B or C to provide a value of output signal 18 at output terminal 16, as will now be described in considerable detail.

Figure 5A:
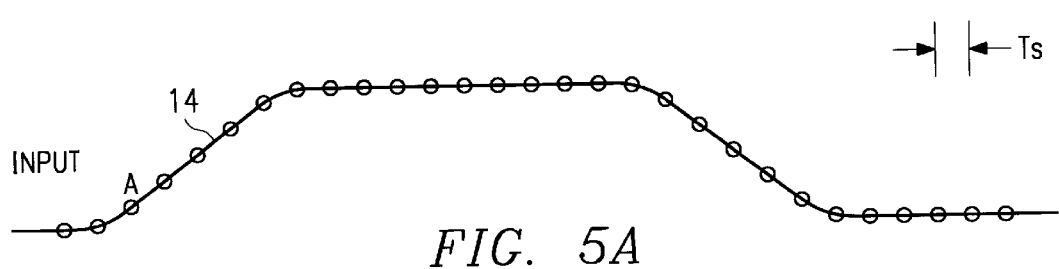
FIGS. 5A, 5B and 5C are graphs is a graph of the three input signals A, B, and C selected by the median logic circuit, the C signal being a twice delayed input signal, the B signal being a derivative of a once delayed input signal, and the A signal being the undelayed input signal, whereby the composite output signal of the median logic circuit is identified by the signal having a series of shaded dots.
Figure 5B:
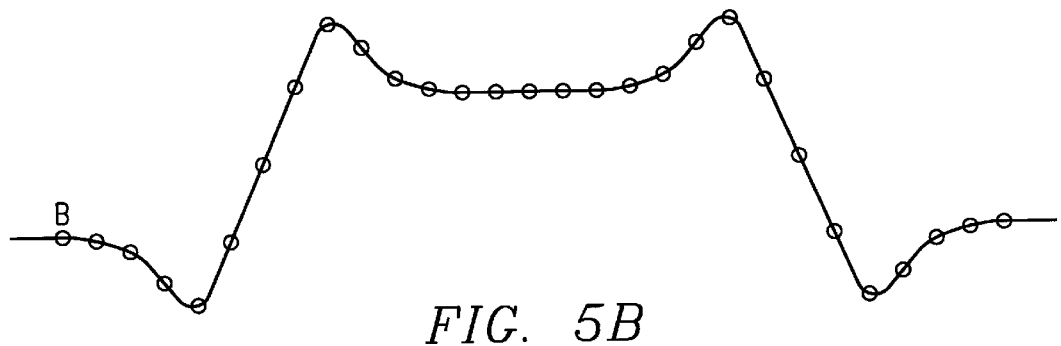
Figure 5C:
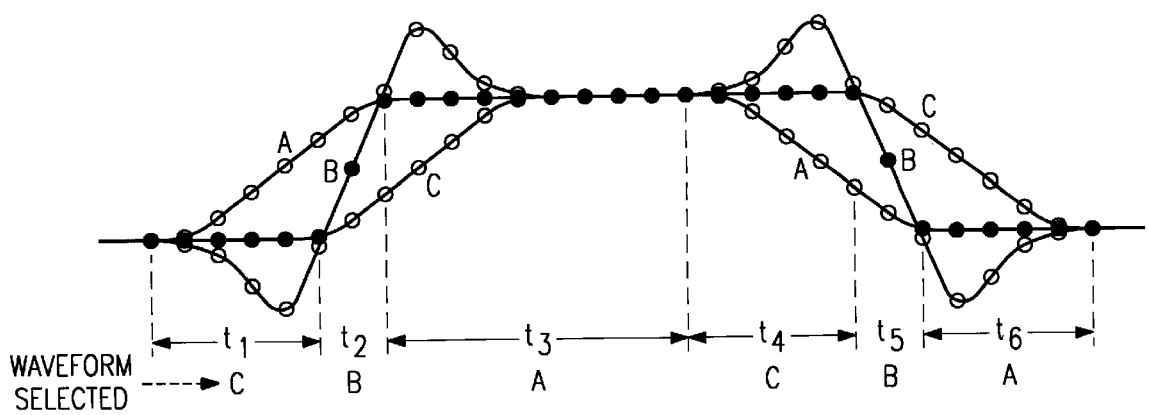

Referring to FIG. 5A, there is shown input signal 14 which is provided to input terminal 12. Median logic circuit 30 samples the value of the input signal 14 as signal A at the indicated data sampling points. Referring to FIG. 5B, there is shown the processed derivative of the input signal delayed the first time period, corresponding to derivative signal B, as generated by the band pass filter 32 and the associated signal processing circuitry. The value of the derivative signal "B" is also sampled by median logic circuit 30 at the same time that input signal 14 is sampled, as shown. Referring to FIG. 5C, there is shown the twice delayed input signal "C", the value of which is also sampled by median logic circuit 30 as the sampling points indicated. Median logic circuit 30 attains the median values among the A, B and C values from these three signals, with the shaded sampling point being the value selected by median circuit 30 and comprising output signal 18. As shown, the signal 18 provided at the output terminal 16 of median logic circuit 30 has a steep rising and falling edge without undershoot or overshoot, with the slope being significantly steeper than the slope of input signal 14.

Referring to FIG. 5C, during time period $T_1$, median logic circuit 30 selects the input values of the twice-delayed input signal C as the values of output signal 18. The values of signal C are selected until the values of derivative signal B are determined to be greater than the values of signal C, indicated during time period $T_2$. The values from signal B are selected and provided as the output 18 of the median logic circuit 30 until the values of the non-delayed input signal A are determined to be less than the values of input signal B, indicating an overshoot of signal B. During time period $T_3$ the values of the non-delayed input signal A are selected as the output 18 for the median logic circuit 30, and provided on output terminal 16. The values of non-delayed input signal A are selected until median logic circuit 30 detects the values of signal A being less than the values of signal C.

During time period $T_4$, the output values of signal C are selected. The values of signal C are selected until the value of the derivative signal B are determined to be less than the values of signal C. Then, during time period $T_5$ the values of signal B are utilized to generate output signal 18 with a sharp down slope. Lastly, the values of signal A are selected during period $T_6$ when the values of signal B drop below the values of signal A.

The values selected by median circuit 30 and provided to output 16 as signal 18 are those shown by the shaded points in FIG. 5C. It is to be specifically noted the sharpness of the slope of the output signal 18 during transitions, and the absence of any undershoot or overshoot. It is further noted that this algorithm is rather simple and straight forward, whereby the values of only three signals are sampled by the median logic circuit 30 to attain the clean output signal 18 provided to output 16, with only two of the signals being processed. Again, this is done by sampling the raw input signal, the twice delayed input signal, and the derivative of the once delayed input signal.

Figure 6:
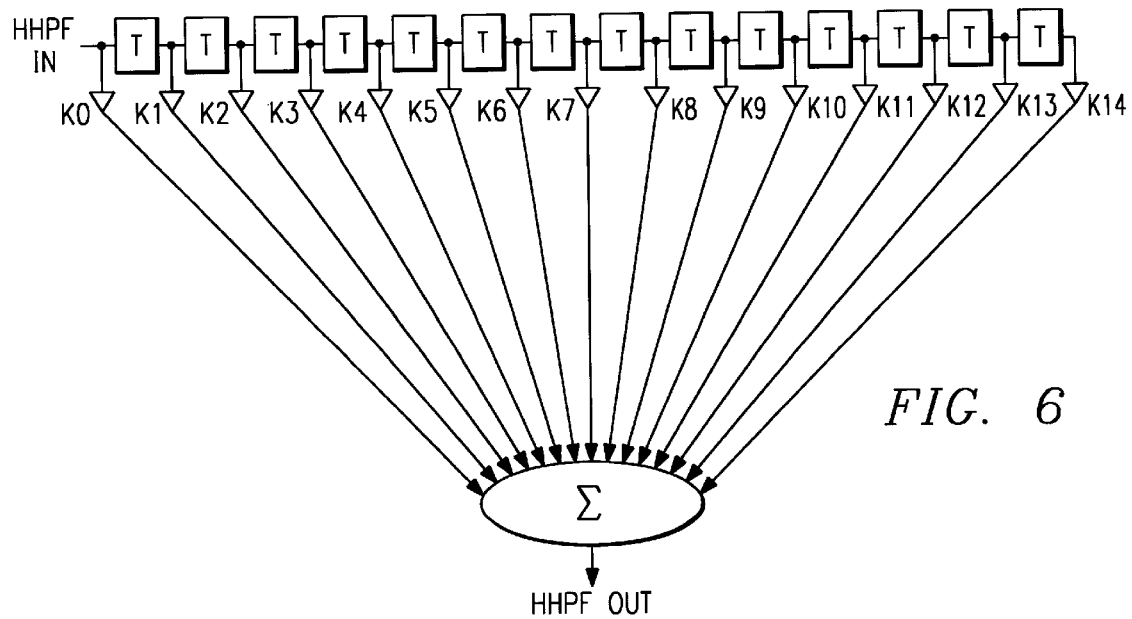
FIG. 6 is an electrical block diagram of a typical 15 tap FIR band pass filter, whereby the 15 coefficients for the amplifiers KO–K14 are shown right, the filter having an $f_{sampling}$ equal to 13.5 MHZ.

Referring now to FIG. 6, there is shown a electrical block diagram basic 15 taps FIR horizontal band pass filter which may be utilized as filter 32 to attain the derivative of the once delayed input chrominance signal. The amplifiers of each tapped signal are indicated as K0–K14, with the coefficients of these amplifiers being shown at the right side of the block diagram. This filter 32 provides a derivative signal of the once delayed input signal that is an approximation to a mathematical derivative. The output of this filter is the summation of the amplified tapped signals, this output being provided to the amplifier 36 in FIG. 3.

Figure 7:
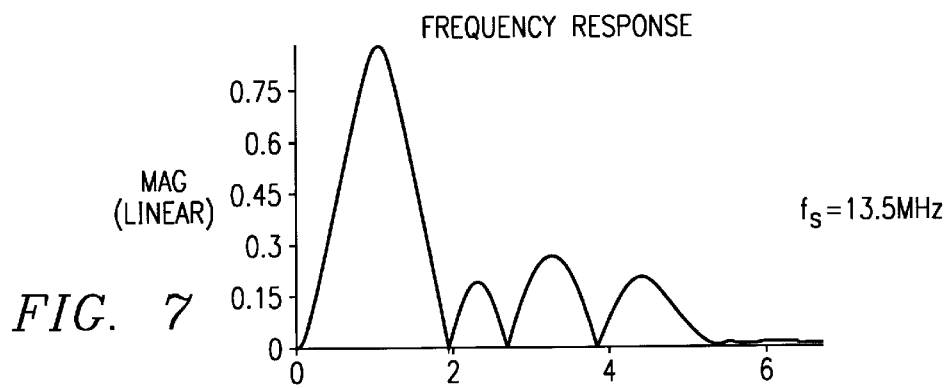
FIG. 7 is a graph of the magnitude of the frequency response of the 15 tap band pass filter shown in FIG. 6.

Referring to FIG. 7, the frequency response and gain of the horizonal band pass filter 32 is shown, whereby $f_{sampling}$ is 13.5 MHZ, and $f_{center}$ is about 1 MHZ. The filter characteristics were chosen to enhance the higher frequency components in the chroma signals that were attenuated in the process of bandwidth limiting the chroma signals to 0.5 MHZ.

Figure 8A:
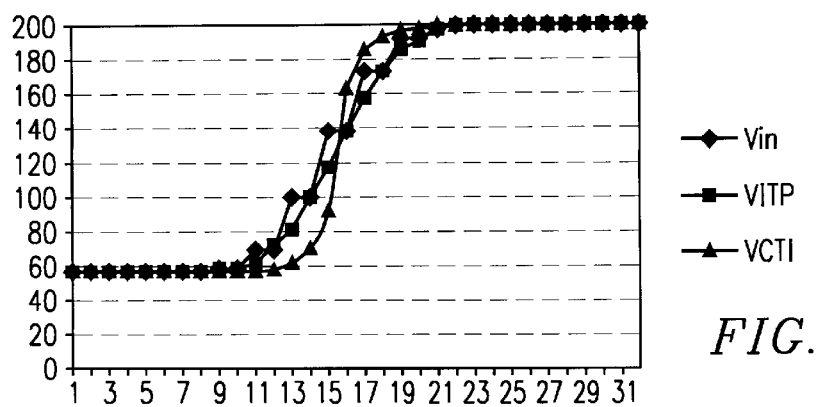
FIG. 8A and FIG. 8B are plots of an input and output of a chrominance V and U signal, respectively.
Figure 8B:
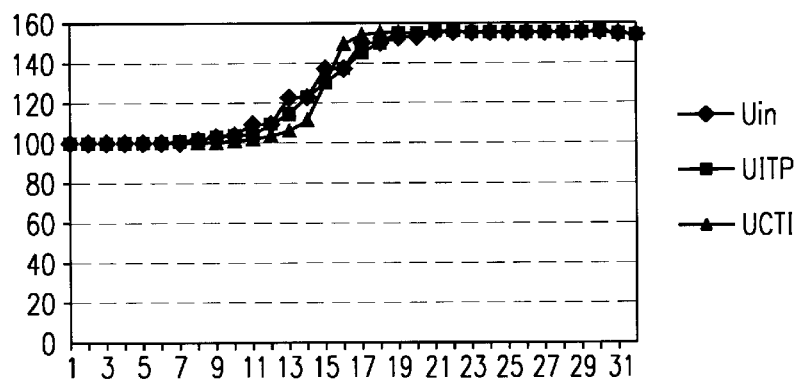

Referring now to FIGS. 8A and 8B, the processing of the chroma V signal and the chroma U signal by a SVP is detailed in Table 1 below, with the transition being indicative of a color bar transient between green and magenta.

TABLE 1

SOURCE: Color Bar, between Green and Magenta

| PE# | Vin | Uin | VITP | UITP | VCTI | UCTI |
|---|---|---|---|---|---|---|
| 362 | 57 | 100 | 56 | 100 | 57 | 101 |
| 363 | 57 | 100 | 57 | 101 | 57 | 101 |
| 364 | 56 | 100 | 56 | 100 | 57 | 101 |
| 365 | 56 | 100 | 56 | 100 | 57 | 101 |
| 366 | 57 | 101 | 56 | 99 | 56 | 100 |
| 367 | 57 | 101 | 57 | 100 | 57 | 101 |
| 368 | 56 | 100 | 56 | 100 | 56 | 100 |

TABLE 1-continued

SOURCE: Color Bar, between Green and Magenta

| PE# | Vin | Uin | VITP | UITP | VCTI | UCTI |
|---|---|---|---|---|---|---|
| 369 | 56 | 100 | 56 | 101 | 57 | 100 |
| 370 | 59 | 103 | 55 | 101 | 56 | 100 |
| 371 | 59 | 103 | 59 | 103 | 57 | 101 |
| 372 | 70 | 109 | 61 | 104 | 56 | 101 |
| 373 | 70 | 109 | 71 | 109 | 59 | 103 |
| 374 | 99 | 122 | 81 | 114 | 61 | 105 |
| 375 | 99 | 122 | 99 | 122 | 71 | 110 |
| 376 | 138 | 137 | 117 | 129 | 91 | 130 |
| 377 | 138 | 137 | 138 | 137 | 165 | 149 |
| 378 | 174 | 150 | 158 | 144 | 186 | 153 |
| 379 | 174 | 150 | 173 | 149 | 193 | 155 |
| 380 | 193 | 155 | 186 | 152 | 197 | 155 |
| 381 | 193 | 155 | 192 | 154 | 198 | 155 |
| 382 | 199 | 156 | 197 | 155 | 199 | 155 |
| 383 | 199 | 156 | 199 | 155 | 199 | 155 |
| 384 | 199 | 155 | 199 | 155 | 199 | 155 |
| 385 | 199 | 155 | 199 | 155 | 199 | 155 |
| 386 | 199 | 156 | 199 | 155 | 199 | 155 |
| 387 | 199 | 156 | 200 | 155 | 200 | 155 |
| 388 | 199 | 155 | 199 | 155 | 199 | 155 |
| 389 | 199 | 155 | 199 | 155 | 199 | 155 |
| 390 | 200 | 156 | 199 | 155 | 199 | 155 |
| 391 | 200 | 156 | 200 | 155 | 199 | 155 |
| 392 | 199 | 155 | 199 | 154 | 199 | 154 |
| 393 | 199 | 155 | 199 | 154 | 199 | 155 |

Referring to Table 1 above, the digital input values for the chroma V and chroma U signals are shown, with these data points being illustrated in FIG. 8A and FIG. 8B, respectively, and identified by the respective legends. A standard digital video format for Y,U,V video is 4:2:2, whereby the Y signal is sampled at 13.5 MHZ and the U and V signals are sampled at 6.75 MHZ. Standard practice is to use an interpolation filter to double the U, V sampling rate by filling in the missing values so that subsequent processing (i.e. CTI) and conversion to R-G-B space would be at the 13.5 MHZ rate. The $V_{in}$ and $U_{in}$ columns shown the chroma data in the 4:2:2 format. The VITP and UITP columns shown the chroma data interpolated to the 4:4:4 format. The output values of the chroma U and chroma V signal, which have been processed by the color transient improvement (CTI) algorithm of the present invention are shown in Table 1 under the heading VCTI and UCTI, with these values being plotted in FIGS. 8A and 8B as well and identified by the legends.

First referring to FIG. 8A, it can be seen that where the slope of the input data $V_{in}$ for the chroma V signal and the interpolated chroma signal VINT are rather gradual, the slope of the output signal VCTI is steep and quickly transitions from about 56 units to 199 units.

Likewise, referring to FIG. 8B, for input values $U_{in}$ of the chroma U signal and the interpolated chroma signal UITP which plotted have a gradual slope, it is seen that the slope of the output signal UCTI provided by the CTI algorithm is also sharp, whereby the output values quickly increase from about 100 units to 155 units.

Figure 9A:
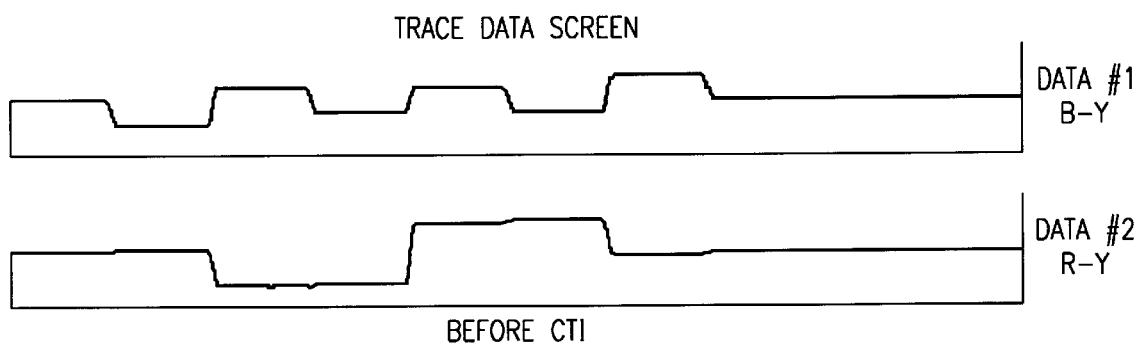
FIG. 9A and FIG. 9B are graphs of a chrominance B-Y and R-Y signal before and after CTI algorithm, respectively.
Figure 9B:
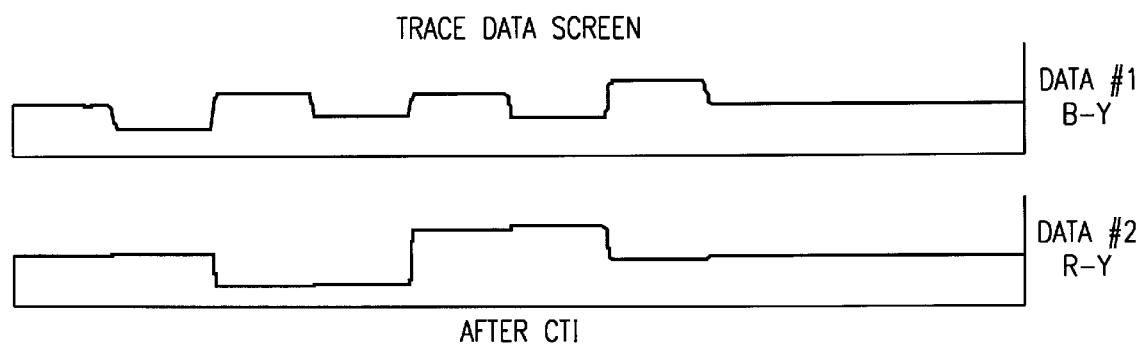

Referring now to FIG. 9A, a typical input chroma B-Y and chroma R-Y signal are shown before CTI. Referring to FIG. 9B, the respective signals of FIG. 11A are shown after CTI, with a corresponding signals having sharpened edges both when rising and falling, as shown. The signals shown in FIG. 9A and FIG. 9B correspond to a SVP DOR trace data being full color bar test patterns.

Referring to Table 2 below, there is shown a set of instructions for a SVP2 for implementing the algorithm of the present invention.

TABLE 2

```
;
    DRI
        width 132
;
;RF0:
;
YOUT .SET0 00h
UOUT .SET0 08h
VOUT .SET0 10h
;
RF00 .SET0 24h
RF01 .SET0 34h
RF02 .SET0 44h
;
Blu .SET0 60h
Red .SET0 74h
Grn .SET0 88h
;
S00 .SET0 9Fh
;
;RF1:
YINP .SET1 00h
UINP .SET1 08h
VINP .SET1 10h
;
RF10 .SET1 24h
RF11 .SET1 34h
RF12 .SET1 44h
;
S10 .SET1 9Fh
;
    M=M,A=A,B=B,C=C
HSYNC, JFAZ $    ;Wait until FlagA = 0.5H
    ┌ MOV OUT'00,R0'Grn'8
    ┤ MOV OUT'08,R0'BLU'8
    └ MOV OUT'16,R0'Red'8
UMR
MOV R1'YINP, INP'00,8 ;Y INPUT
MOV R1'UINP, INP'08,7 ;U(B−Y)IN
NOT R1'UINP+7,INP'15.1
MOV R1'VINP, INP'16,7 ;V(R-Y)IN
NOT R1'VINP+7,INP'23,1

;
;U(13Y)INTERPOLATION
ADD R0'RF00-1,R1'UINP, 8,L2R1'UINP, 8,3
SUB R1'RF10-3,R0'RF00-1,9,L2R0'RF00-1,9,3
SUB R1'RF10-3,R1'RF10-3,10,R2R1'RF10-3,10,3
ADD R0'RF00-1,R0'RF00-1,9,R1'RF10-1,9,3
;#
;#KMOV R1'UINP, R0'RF00,8,PENO'0
;#
M=PENO(0),A=0,B=0,C=1
B=R0(RF00+0), R1(UINP+0)=KCY
B=R0(RF00+1), R1(UINP+1)=KCY
B=R0(RF00+2), R1(UINP+2)=KCY
B=R0(RF00+3), R1(UINP+3)=KCY
B=R0(RF00+4), R1(UINP+4)=KCY
B=R0(RF00+5), R1(UINP+5)=KCY
B=R0(RF00+6), R1(UINP+6)=KCY
B=R0(RF00+7), R1(UINP+7)=KCY

;
;V(RY)INTERPOLATION
ADD R0'RF00-1,R1'VINP, 8,L2R1'VINP,8,3
SUB R1'RF10-3,R0'RF00-1,9,L2R0'RF00-1,9,3
SUB R1'RF10-3,R1'RF10-3,10,R2R1'RF10-3,10,3
ADD R0'RF00-1,R0'RF00-1,9,R1'RF10-1,9,3
;#
;#KMOV R1'VINP, R0'RF00,8,PENO'0
M=PENO(0),A=0,B=0,C=1
B=R0(RF00+0), R1(VINP+0)=KCY
B=R0(RF00+1), R1(VINP+1)=KCY
B=R0(RF00+2), R1(VINP+2)=KCY
B=R0(RF00+3), R1(VINP+3)=KCY
B=R0(RF00+4), R1(VINP+4)=KCY
B=R0(RF00+5), R1(VINP+5)=KCY
```

TABLE 2-continued

```
B=R0(RF00+6), R1(VINP+6)=KCY
B=R0(RF00+7), R1(VINP+7)=KCY
;U(BY)CTI
ADD R0'RF01-1, R1'UINP,8,LR1'UINP, 8,3
ADD R0'RF01-1, R0'RF01-1,9,RR0'RF01-1,9,3 ;(1+1/z)(1+z)
MOV R1'RF10,MR0'RF01,9
MOV R1'RF11,R4R0'RF01,9
ADD R0'RF01, LR0'RF01,9,RR0'RF01,9,3 ;(1+1/z)(1+z)(1/z+z)
SUB R0'RF01, R0'RF01,10,L2R1'RF10,9,3 ;X (1−z⁻³)
SUB R0'RF01, R0'RF01,10, R2R1'RF11,9,3 ;X(1−z⁻³)(1−z −3)
CORE R0'RF01, R0'RF01 ,10,8,1 ;CORING −8
ADD R0'RF01, R0'RF01,10,R1 'UINP,8,3
CLPBT R0'RF01,8,R0'RF01,10,R1'S10
SWAP R0'RF01, R1'UINP,8
MID R1'UINP,R2R0'RF01,L2R0'RF01,8,R0'S00,R1'S10,3
;
;V(RY)CTI
;
ADD R0'RF01-1,R1'VINP,8,LR1'VINP, 8,3
ADD R0'RF01-1,R0'RF01-1,9,RR0'RF01-1,9,3 ;(1+1/z)(1+z)
MOV R1'RF10,L4R0'RF01,9
MOV R1'RF11,R4R0'RF01,9
ADD R0'RF01,LR0'RF01,9,RR0'RF01,9,3 ;(1+1/z)(1+z)(1/z+z)
SUB R0'RF01,R0'RF01,10,L2R1'RF10,9,3 ;X(1−z⁻³)
SUB R0'RF01, R0'RF01,10,R2R1'RF11,9,3 ;X(1−z⁻³)(1−z⁻³)
;
CORE R0'RF01, R0'RF01,10,8,1 CORING −8
ADD R0'RF01, R0'RF01,10,R1'VINP,8,3
CLPBT R0'RF01,8,R0'RF01,10,R1'S10
SWAP R0'RF01,R1'VINP.8
MID R1'VINP,R2R0'RF01,L2R0'RF01,8,R0'S00,R1'S10,3
    ┌ MOV R0'Grn,R1'INP'8
    ┤ MOV R0'BLU,R1'VINP'8
    └ MOV R0'Red,R1'YINP'8
JMP HSYNC
```

As shown, only 176 SVP instructions are required for the algorithm of the present invention. Thus, the present invention has rather simple architecture with logical operation and is well considered for the implementation by digital signal processing. The present invention can also be easily implemented by a small number of gates on an application specific integrated circuit (ASIC) or a field programmable gate array (FPGA). In a typical SVP2, there is a discrete processing element (PE) for every pixel of the display. Thus, each PE of the SVP would be programmed with the instructions of Table 2. While the instructions shown in Table 2 are those of the preferred embodiment, limitation to these instructions is not to be inferred.

In summary, the CTI method and apparatus of the present invention is rather simple, straight forward and inexpensive, and well suited for processing bandwidth limited chrominance signals such as those used in a television with digital signal processing. A simple median logic circuit 30, preferably being a microprocessor based circuit, samples all three input signals A, B and C and selects the values from one of these three signals as shown and discussed in reference to FIG. 5C. The resulting output signal 18 has a sharp slope for the rise and fall portions of the signal. During time period $T_1$, the values of the twice delayed chrominance input signal are utilized. During time periods $T_2$ and $T_5$, the values of the derivative B signal are utilized as they correspond to a sharp or steep slope. By utilizing the values of the B signal only during time period $T_2$ and $T_5$, the undershoot or overshoot portions of the B signal are not utilized. During time period $T_3$, the non-delayed chrominance input signal is utilized. During time period $T_4$, the twice delayed input signal C is utilized. During time period $T_6$, the values of the non-delayed input signal A are utilized. In summary, median logic circuit 30 samples the values of the three input signals A, B and C , and selects the values from these three signals to provide an output signal 18 with a steep transition slopes.

The present invention is applicable for digital processing of any bandwidth limited signal, such as the video limited luminance signals. Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A signal processor, comprising:

(a) input means for receiving an input signal;

(b) first delay means responsive to said input means for delaying said input signal a first time period and providing a first signal;

(c) second delay means responsive to said input means for delaying said input signal a second time period and providing a second signal;

(d) derivative means responsive to said first delay means for providing a derivative signal of said first signal; and (e) median filter means receiving three signals comprising said input signal, said second input signal and said derivative signal, and providing an output signal by selecting from said three signals whereby said output signal has a slope steeper than a slope of said input signal.

2. The signal processor as specified in claim 1 wherein said second time period is greater than said first time period.

3. The signal processor as specified in claim 1 wherein said derivative means comprises a band pass filter.

4. The signal processor as specified in claim 3 further comprising a gain amplifier circuit receiving said derivative signal.

5. The signal processor as specified in claim 4 further comprising a coring circuit processing said derivative signal.

6. The signal processor as specified in claim 5 further comprising an adder circuit summing said derivative signal from said coring circuit with said input signal delayed said first time period.

7. The signal processor as specified in claim 5 further comprising a clipping circuit processing said derivative signal from said coring circuit.

8. A signal processor, comprising;

(a) an input receiving an input signal;

(b) a first delay circuit connected to said input and delaying said input signal a first time period;

(c) a second delay circuit connected to said input delaying said input signal a second time period, said second time period being longer than said first time period;

(d) a derivative circuit connected to said first delay circuit providing a derivative signal of said input signal delayed said first time period; and (e) a median logic circuit selecting from said input signal, said input signal delayed said second time period, and said derivative signal, and providing an output signal having a slope being steeper than a slope of said input signal.

9. A method of processing a signal, comprising the steps of:

(a) sampling an input signal;

(b) delaying said input signal a first time period and a second time period, said second time period being longer than said first time period;

(c) providing a derivative signal of said input signal delayed said first time period; and (d) providing an output signal by selecting from said input signal, said input signal delayed said second time period, and said derivative signal whereby said output signal has a steeper slope than said input signal.

10. The method as specified in claim 9 whereby said derivative signal is obtained by processing said input signal with a band pass filter.

11. The method as specified in claim 9 comprising the step of selecting said derivative signal to provide a steep transition of said output signal.

12. The method as specified in claim 11 comprising the step of selecting said derivative signal as said output signal when a value of said derivative signal is greater than a value of said input signal delayed said second time period.

13. The method as specified in claim 12 comprising the step of selecting said input signal delayed said second time period as said output signal when the value of said derivative signal is less than the value of said input signal delayed said second time period.

14. The method as specified in claim 12 comprising the step of selecting said input signal as said output signal when the value of said derivative signal is greater than a value of said input signal.

15. The method as specified in claim 11 comprising the step of selecting said derivative signal as said output signal when a value of said derivative signal is less than a value of said input signal delayed said second time period.

16. The method as specified in claim 15 comprising the step of selecting said input signal delayed said second time period as said output signal when the value of said input signal is less than the value of said input signal delayed said second time period.

17. The method as specified in claim 15 comprising the step of selecting said input signal as said output signal when the value of said input signal is greater than a value of said derivative signal.

* * * * *